United States Patent Office 2,819,934
Patented Jan. 14, 1958

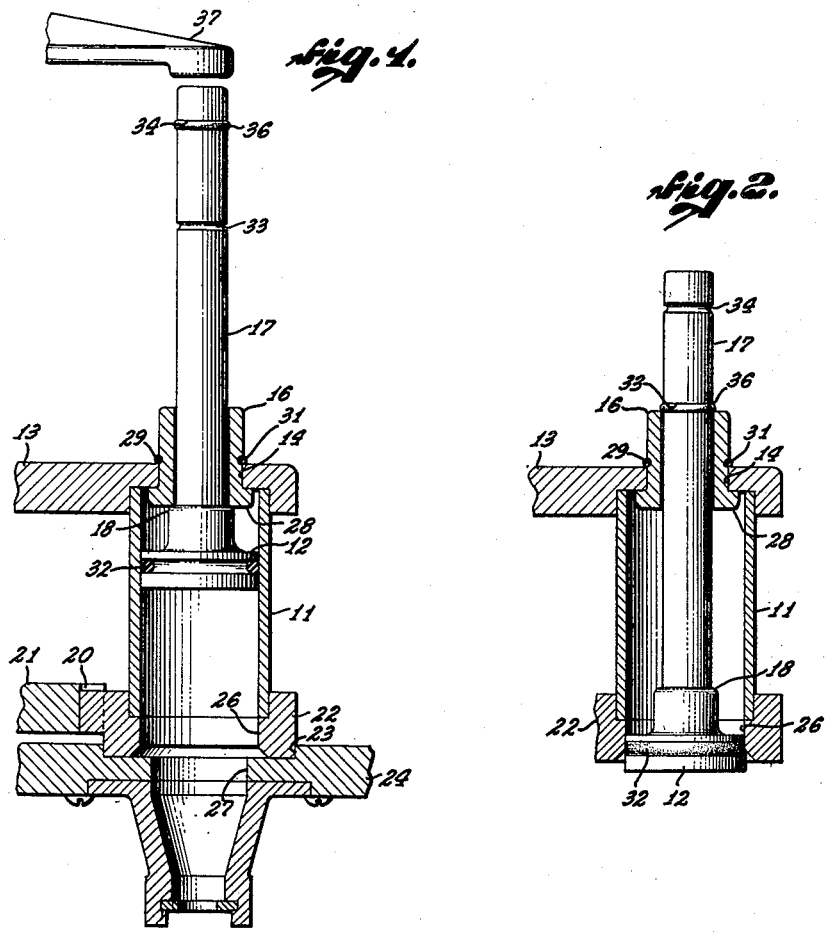

2,819,934
REMOVABLE PLUNGER ARRANGEMENT

Marcellus C. Luterick, Montrose, Calif., assignor, by mesne assignments, to Diced Cream of America Co., Los Angeles, Calif., a corporation of Delaware Application April 5, 1954, Serial No. 421,057

3 Claims. (Cl. 309—2)

This invention relates to plunger mechanisms, and more particularly such mechanisms as are used for dispensing measured quantities of a flowable food product, such as ice cream in liquid or semi-liquid form.

Although clearly not limited to such application, this invention has particular utility in connection with ice cream dispensing apparatus of the type disclosed in U. S. patent application Serial No. 190,202, filed October 14, 1950, for Ice Cream Packaging Machine, now United States Patent No. 2,679,966.

It is an object of this invention to provide an arrangement of food dispensing parts which is easily disassembled for cleaning.

It is another object of this invention to provide food dispensing apparatus which does not involve inaccessible crevices that are virtually impossible to clean.

It is a further object of this invention to provide means for facilitating the rapid disassembly and assembly of food dispensing machinery, when the same is required to be cleaned.

It is a further object of this invention to provide an improved ice cream dispensing piston and cylinder arrangement which produces an ice cream product of uniform constituency.

It is another object to provide a means to prevent injury to critical parts of dispensing machinery during the cleaning operation.

In accordance with these objects and other objects which will become apparent hereinafter, a preferred embodiment of the present invention is illustrated in the accompanying drawing wherein:

Figure 1 is a sectional elevation of the apparatus of this invention; and

Figure 2 is a similar sectional elevation showing the parts in different position.

In Figure 1 there is shown a dispensing cylinder and piston arrangement generally similar to the dispensing arrangement illustrated particularly in Figure 19 of the above mentioned U. S. patent but improved in accordance with the present invention.

The dispensing cylinder and piston arrangement illustrated in Figure 1 comprises a cylinder 11 within which reciprocates a piston 12. The upper end wall of the cylinder 11 is comprised of a plate 13 having an opening 14 therein. Disposed within the opening 14 is a bushing 16. Loosely fitting and reciprocating in the bushing 16 is a piston rod 17 extending through the bushing 16. The lower end of the rod 17 is secured to the piston 12. It is preferred to form the rod 17 and the piston 12 integrally of a single piece of a polyamide resin such as nylon. Between the rod 17 and piston 12 there is formed, in the integral structure, a shoulder 18 which serves as an upper limit stop for the piston.

The plate 13 may be a circular plate forming part of a turret rotatable about a vertical axis parallel to and spaced from the piston 17, as shown in Figure 19 of said Patent 2,679,966 to which reference is made for a further understanding of this structure. The turret structure also includes a concentric ring 22, together with several cylinders 11 extending between plate 13 and ring 22. The turret is removably linked to a driving hub 21 by means of several keys 20 formed on the ring 22. As the turret, consisting of plate 13, ring 22 and cylinders 11, is rotated about its axis, the ring 22 slides annularly in a circular groove 23 formed in a stationary base 24, concentric with the turret and hub 21.

The interior of the cylinder 11 communicates at its lower end with a circular bore 26 in the ring 22, which in turn communicates (when the turret is properly positioned) with a circular dispensing bore 27 in the base 24.

At its lower end the bushing 16 is provided with an integral flange 28, located inside the cylinder 11, which abuts the inside of the end plate 13 circumjacent the opening 14. The bushing 16 is held in place in the end plate or wall 13 by being provided with a peripheral groove 29, the bottom edge of which is substantially flush with the top surface of the plate 13; and in the groove 29 is seated an elastic, easily stretchable, unbroken ring such as a neoprene O ring 31. The outer diameter of the O ring 31 is appreciably larger than the opening 14, thereby preventing the bushing 16 from dropping down into the cylinder 11. When it is desired to remove the bushing 16 from the assembly, it is only necessary to slide or roll the O ring 31 out of the groove 29 and up the surface of the bushing and remove it, thereby allowing the bushing to drop through the opening 14.

The piston 12 has a resilient ring, as for example a neoprene O ring 32, seated in a groove therein in close sliding engagement with the inside of the cylinder 11.

In operation the piston 12 measures a charge of flowable food, such as ice cream injected into the cylinder 11, when the cylinder is positioned by proper positioning of the turret over a feeding opening. The ice cream is injected at the bottom of the cylinder 11 under a predetermined pressure, thereby causing the piston 12 to be pushed upward until the shoulder 18 engages the flange 28 of the bushing 16, as shown in Figure 1. The cylinder 11 is thus filled with a charge of ice cream.

The turret is then rotated, with the ring 22 riding in the groove 23 until bore 26 is registered with a dispensing bore 27. Thereupon an actuating arm 37 is moved downward against the upper end of the piston rod 17, causing the piston 12 to discharge the contents of the cylinder 11 out through the opening 27. Following discharge, the turret is again rotated so that the cylinder may be refilled with another charge. For further understanding of the dispensing operation above described, reference is made to the above mentioned patent.

From the brief discription set forth above, it will be readily apparent that the apparatus herein described and shown in Figure 1, operating as it does in an environment of liquid food product, will require periodic thorough cleaning in order to meet sanitation requirements. In fact, cleaning, is required so often that it is most desirable that the parts which are subject to contact by the food be readily disassembled so that they can be thoroughly sterilized and cleaned before being replaced. In accordance with the present invention, the parts are so made that all surfaces which might become contaminated with the food product, are readily exposed and removed from the machine for quick cleaning.

This cleaning operation is effected by the removal of the turret from the rest of the mechanism including the base 24 and hub 21. Such removal exposes the ring 22 to accessibility for cleaning. The piston 12 including the rod 17 should also be readily removable for cleaning. It is desirable, however, that in the disassembly and assembly operations the piston 12 be held up in the cylinder 11 so that it does not drop clear of the ring 22 to a position where it might be injured or nicked, when the turret is lifted from the base 24. It is further desirable that a safety means should be provided so that the piston does not drop completely out of the cylinder 11 in case of forgetfulness of the operator. To these ends the rod 17 is provided with two axially spaced grooves 33 and 34 in which is selectively disposed an elastic, easily stretchable, unbroken ring, as for example, a neoprene O ring 36.

In normal operation the ring 36 is seated in the upper groove 34. This allows the piston 12 to reciprocate to its normal excursion without interfering in any way with the operation of the apparatus. At the same time it serves as a safety measure to prevent the piston 12 from dropping completely out of the turret during the removal operation. In practice it is desired that the piston 12 should be suspended up in the cylinder 11 so as to prevent damage to the piston. During the removal operation, therefore, the ring 36 is slid or rolled out of the groove 34 and shown into the groove 33, as shown in Figure 2. Thus the piston 12 is held in the turret and is not allowed to drop clear of the ring 22 where it might become damaged as by nicking.

The arrangement described and illustrated is particularly efficacious in providing quick and ready disassembly and assembly of the parts during the periodic cleaning and sterilization which must be made at regular intervals, as will be evidenced from the following description of the operation.

To clean the apparatus the operator first lifts the piston rod 17 and then rolls the O ring 36 down from the groove 34 into the groove 33. He then allows the rod 17 to drop to the position shown in Figure 2, wherein the piston 12 is held up in a safe position. The turret, including plate 13, ring 22 and cylinders 11, is then lifted from the base 24 and from hub 21. During this removal operation the piston 12 is held up out of harm's way by the O ring 36.

The operator then removes the O ring 36 completely from the piston rod 17 and allows the piston and rod to drop completely out of cylinder 11. The piston 12 and rod 17, being made of a single integral piece of nylon, and being formed without small crevices, is then readily cleaned and sterilized.

Since the crevices around the bushing 16 must also be cleaned, it is a simple matter to remove the bushing from the turret simply by rolling up the O ring 31 and allowing the bushing 16 to drop down clear of the cylinder 11. The bushing 16 may then also be cleaned.

It will be noted that the O ring 32 is also readily removable from the piston 12 for sterilization of the groove in which it is seated. The parts are replaced in the reverse order and the machine is ready for opeartion.

The upper groove 34 not only allows the O ring 36 to provide a safety feature precluding accidental dropping of the piston out of the cylinder 11, but also provides a convenient repository for the O ring 36 during normal operation when it is not needed for the retention feature illustrated in Figure 2.

The fact that the piston 12 and associated rod 17 are made of nylon is important, because this material is not only sanitary in that it will not corrode from the constant contact of food, i. e., the ice cream, but it is also very light in weight. This light weight feature is important in the commercial dispensing of ice cream, because a heavy piston and rod would cause the ice cream to become compressed as it is forced into the cylinder by the pressure behind it. This compression of the ice cream would force out some of the air content in the ice cream, thus rendering it more dense with consequent loss of profit to the ice cream manufacturer, as well as making a non-uniform, heavy product which is not as saleable. Thus the light weight of the piston and rod markedly contributes to a uniform ice cream product of relatively low density. In a highly competitive market, where density of the ice cream is quite critical, this factor is quite important.

From the above description it will be seen that there has been provided by this invention an arrangement of parts whereby the reciprocable piston and associated elements may be quickly and easily disassembled for cleaning, and in which the resulting product may be maintained at uniform density without the undesirable expulsion of air.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims.

I claim:

1. Dispensing apparatus comprising a cylinder having an opening in at least one end wall thereof, a piston reciprocable within said cylinder, a piston rod secured to said piston and extending through said opening, a bushing circumjacent said rod and disposed in said opening, said piston rod being fitted and reciprocating loosely in said bushing, said bushing having a flange on the inner end thereof abutting the wall of said cylinder around said opening, said bushing also having a peripheral groove therearound immediately outside said wall, and an elastic, easily stretchable, unbroken ring disposed in said groove, the outer diameter of said ring being greater than the diameter of said wall opening, said ring thereby holding said bushing in position in said wall.

2. Apparatus according to claim 1, wherein said rod is provided with a pair of spaced circular grooves therearound, and a resilient ring selectively disposable in either of said grooves, the outer diameter of said ring being larger than the inner diameter of said bushing, whereby said ring constitutes an adjustable limit stop restricting inward movement of said rod into said cylinder.

3. Apparatus according to claim 1 wherein said piston and rod are formed integrally of one piece of nylon.

References Cited in the file of this patent

UNITED STATES PATENTS

| 277,213 | Bunkerhoff | May 8, 1883 |
| 1,637,247 | Snyder | July 26, 1927 |
| 1,932,796 | McNaught | Oct. 31, 1933 |
| 1,933,371 | Eastman | Oct. 31, 1933 |
| 2,055,602 | Dodge | Sept. 29, 1936 |
| 2,128,254 | Kile | Aug. 30, 1938 |
| 2,354,649 | Bruckner | Aug. 1, 1944 |

FOREIGN PATENTS

| 116,079 | Great Britain | Aug. 8, 1918 |